United States Patent [19]
Drucker

[11] Patent Number: 5,983,634
[45] Date of Patent: Nov. 16, 1999

[54] SOLAR ENERGY POWERPLANT WITH MOBILE REFLECTOR WALLS

[76] Inventor: Ernest R. Drucker, 226 Searle Avenue, North York, Ontario, Canada, M3H 4B9

[21] Appl. No.: 09/040,347

[22] Filed: Mar. 18, 1998

[51] Int. Cl.⁶ ............................... F16D 31/02; F03G 6/00
[52] U.S. Cl. ......................... 60/398; 60/641.8; 60/641.15
[58] Field of Search .................................... 60/398, 641.8, 60/641.11, 641.12, 641.15; 290/44, 55

[56] References Cited

U.S. PATENT DOCUMENTS

| | | |
|---|---|---|
| 3,048,006 | 8/1962 | Goodman . |
| 3,924,604 | 12/1975 | Anderson . |
| 3,979,597 | 9/1976 | Drucker . |
| 3,981,151 | 9/1976 | St. Clair . |
| 4,388,533 | 6/1983 | Campbell et al. . |
| 4,399,368 | 8/1983 | Bucknam ........................... 60/641.8 X |
| 4,462,213 | 7/1984 | Lewis ..................................... 60/641.8 |
| 4,485,803 | 12/1984 | Wiener .............................. 60/641.8 X |
| 4,508,971 | 4/1985 | Bailey . |
| 4,581,897 | 4/1986 | Sankrithi ........................... 60/641.11 X |
| 4,779,006 | 10/1988 | Wortham . |
| 5,694,774 | 12/1997 | Drucker . |

FOREIGN PATENT DOCUMENTS

| | | |
|---|---|---|
| 2307982 | 11/1976 | France . |
| 2 218 314 | 11/1989 | United Kingdom . |

*Primary Examiner*—Hoang Nguyen

[57] ABSTRACT

A solar energy powerplant is described which involves a system of mobile reflector walls. The powerplant comprises: a group of four or more vertical towers open at both ends, said towers being mounted on a base structure in an equally spaced configuration; a plurality of vertically spaced, radially projecting heating chambers mounted externally on each tower, the chambers at each level being arranged as a pair of diametrically opposed segment-shaped chambers projecting from the tower a distance at least equal to the radius of the adjoining tower, with each chamber being divided into a series of smaller segment-shaped compartments separated by radial divider walls, each said segment-shaped compartment having an inlet for ambient air and an outlet into the tower for heated air; tiltable concave mirrors mounted on the outermost edges of the segment-shaped chambers for directing sun rays onto the heating chambers of adjacent towers; mobile reflector walls mounted for travel on tracks substantially surrounding said group of vertical towers, said mobile walls extending a height substantially equal that of the highest heating chambers and being spaced laterally from the towers, with the face of each mobile wall facing the towers having mounted thereon a plurality of tiltable concave mirrors for directing sun rays onto the towers; a water reservoir mount at the top of each tower and a water reservoir in the base structure of the powerplant, conduit and pump means for moving water between said reservoirs by way of heat exchange coils in said heating chambers such that hotter water is stored in the reservoir in the base structure and cooler water is stored in the reservoir at the top of each tower; and wind-powered impellers horizontally mounted in each tower in vertically spaced locations in association with said heating chambers, said impellers being adapted to drive electrical generating units.

16 Claims, 5 Drawing Sheets

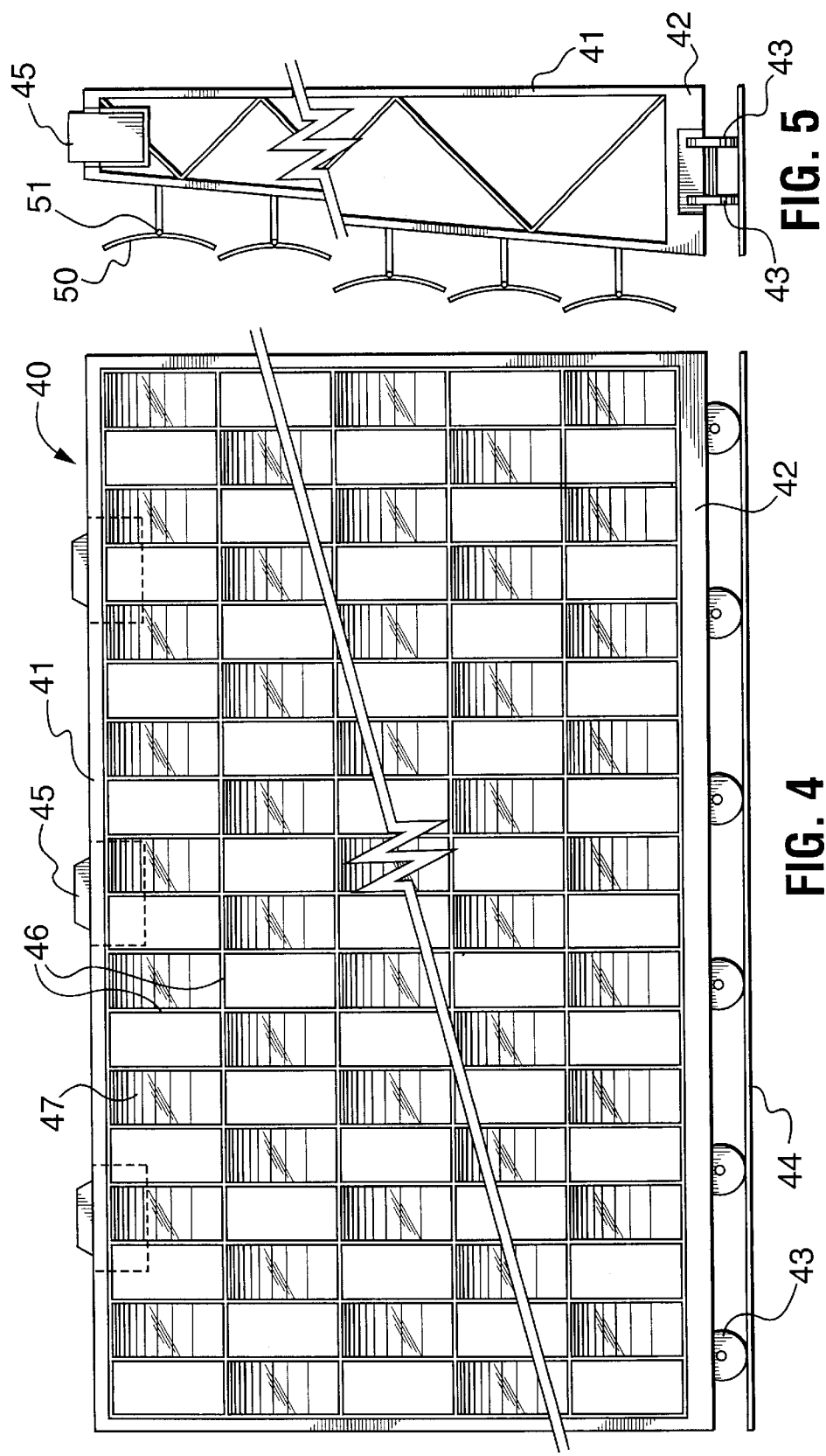

SOLAR ENERGY POWERPLANT WITH MOBILE REFLECTOR WALLS

BACKGROUND OF THE INVENTION

1. Field of the Invention

This invention relates to a system for producing electrical energy, particularly with the use of solar heat as the prime energy source.

2. Description of the Prior Art

The patent literature is replete with systems utilizing wind, waves, and solar heat as energy sources for generating electrical power. The main sources of electrical power in the world today are hydroelectric systems and fossil fuel powered generating systems. The next most significant source of electrical power is nuclear powered generators.

As far as hydroelectric power is concerned, the power generators must be reasonably close to their ultimate market and the heavily populated and industrialized sections of the world are fast using up all available new sources of hydropower. The systems powered by fossil fuels such as coal, gas and oil have the problem that these fuels are now becoming in short supply and also are becoming extremely expensive. Also, fossil fuels are environmentally objectionable, since these contribute to global warming and also contaminate the atmosphere by leaving poisonous residues not only in the air, but also often in many effluents. The nuclear systems are not only very expensive in terms of construction costs but they also have the problem of requiring extensive safety systems to protect against the radiation in the plant itself. Moreover, there is also the major problem of safely disposing of the highly dangerous wastes.

Because of these problems with the traditional systems, there has been a greatly increased interest in solar energy as a major energy source. Various systems have been proposed involving the use of solar energy for generating electrical power and some such systems have recently been developed for space vehicles; see, for instance, Canadian Patent No. 718,175, issued Sep. 21, 1965. That system uses a solar energy absorber for heating a liquid which vaporizes to drive a turbine which in turn drives a generator. Such a system with its vaporizing and condensing systems is obviously practical only for very small systems such as would be used in space crafts.

There are many patents in existence which describe the use of wind power for driving electrical generators and one quite recent form of wind turbine generator is that described in U.S. Pat. No. 3,720,840 issued Mar. 14, 1973. In Goodman, U.S. Pat. No. 3,048,066, a vertical stack arrangement is described having a series of fans driven by solar created thermal currents, with the fans being capable of driving electric generators.

The failure of ground level solar energy collectors in the past has been related to an inadequate collection area. Thus, it is known that for a sunny region such as Texas, an average heat absorption of an optimally tilted collector is about 0.45 kw/m$^2$ as a year round average sunny, daylight hours. On this basis it has been estimated that a collector area of 37 square miles would be required for a 1000 mw power plant.

Of course, it is highly desirable to have these plants close to major population areas and in these areas land is at a premium. One design of solar power plant capable of greatly decreasing the land area requirements for a given amount of power production is that described in Drucker, U.S. Pat. No. 3,979,597, issued Sep. 7, 1976. A further improvement to that solar power plant is described in Drucker, U.S. Pat. No. 5,694,774.

It is the object of the present invention to further improve the efficiency of the power plant of U.S. Pat. No. 5,694,774.

SUMMARY OF THE INVENTION

In accordance with the present invention there is provided a solar energy power plant for producing electrical energy having as a principle component a group or cluster of tall, vertical towers. These towers are mounted on a base structure in a spaced configuration. A plurality of wind-powered impellers are mounted in vertically spaced locations within each tower such that chimney up-drafts in the towers drive these impellers. The impellers in turn drive electrical generators.

A plurality of vertically spaced, radially projecting heating chambers are mounted externally on each tower. The chambers at each level are arranged as a pair of diametrically opposed segment-shaped chambers projecting from the tower a distance at least equal to the radius of the adjoining tower. Each chamber forms a segment of about 60 to 90° and is divided into a series of segment-shaped compartments separated by radial divider walls. Each segment-shaped compartment has an inlet for ambient air and an outlet into the tower for heated air.

Secondary heating chambers are preferably associated with the above radially projecting chambers, with each secondary heating chamber being positioned beneath a radially projecting chamber and having a V-shaped configuration with one wall being a wall of the tower and the other wall being upwardly and outwardly inclined from the tower and connecting at its upper end to the bottom wall of the radially projecting chamber immediately above. Thus, each secondary chamber provides a support for the radially projecting chamber immediately above and each secondary heating chamber has an inlet for ambient air and an outlet into the tower for heated air.

A water reservoir is mounted at the top of each tower and a further water reservoir is provided in he base structure of the power plant. Heat exchange coils are located within the heating chambers and water passes through these coils while travelling back and forth between the reservoir in the base structure which holds hot water and the reservoir at the top of the tower which holds cooler water. Thus, during periods of maximum solar heating, cooler water from the reservoir at the top of each tower moves down through the heat exchangers and is heated and stored in the bottom reservoir. Then, during periods of low or no solar radiation, outside air entering the bottom of each tower is passed over the warm water in the bottom reservoir whereby the temperature of the air is raised by about 2–3° C. This creates an up-draft of air within each tower.

Additional heat from the warm or hot water in the bottom reservoir may be utilized by passing the warm water through a heat exchanger pump which is used to produce steam. Heat can be removed in this manner from the water in the bottom reservoir until its temperature is only about 5° C. higher than outside air. The steam generated may be used to power turbines for producing additional electricity.

The solar heating is concentrated by tiltable concave mirrors mounted on the outermost edges of the segment-shaped compartments. Each compartment outer edge carries a pair of separately tiltable concave mirrors which can be tilted such that they will heat both the top faces of the radially projecting heating chambers as well as their lower faces and the secondary heating chambers.

The towers are tall relative to their diameters since this produces the highest upward air velocities. A typical tower has a height of approximately 50 to 100 meters and a base diameter of about 10 to 20 meters, a preferred design is a tower having a height of about 60 meters, with 30 heating chamber levels vertically spaced at a distance of about 2 meters. Each 2 meter vertical space preferably holds two horizontally mounted impellers each having a diameter of about one meter.

For towers of the above type, a typical water reservoir at the top of each tower may have a diameter in the order of 20 meters and a volume of about 25 cubic meters.

An important feature of this invention is an arrangement of mobile reflector walls mounted for travel on tracks substantially surrounding the group of vertical towers. These mobile walls extend at heights substantially equal that of the highest heating chambers and are spaced laterally from the towers. The face of each mobile wall facing the towers has mounted thereon a plurality of tiltable concave mirrors for directing sun rays onto the towers.

These reflector walls work in combination with the pairs of diametrically opposed segment-shaped heating chambers on the towers. Thus, the heating chambers are mounted in easterly and westerly directions and the reflector walls during the course of a day travel around the group of towers from east to west. This is a more efficient arrangement than simply providing heating chambers surrounding each tower. Chambers facing north and south are is not found to be efficient and the combination of chambers facing east and west and the mobile reflector walls insures the maximum sun exposure during the time that the sun shines at any location.

According to a further feature of this invention, the surfaces of the towers and the mobile reflector walls exposed to the rays of the sun provide excellent locations for photovoltaic cells. These are best mounted on the top faces of the radially projecting heating chambers and on the outer walls of the secondary heating chambers. The photovoltaic cells are used for direct production of electricity during sunlight hours and may produce up to 10% of the total electricity production of each tower.

By providing these high towers in combination with the plurality of radially projecting, vertically spaced solar heating chambers mounted on the tower, a very large effective solar energy collecting area is provided directly on the tower itself rather than the usual method of using ground collectors spread over a large area. This arrangement with the tiltable mirrors takes special advantage of the fact that through almost the entire period of sunlight each day the rays of the sun are at an angle to the vertical.

By arranging the towers in clusters with the concave mirrors mounted at the outermost edges of the heating chambers in combination with the mirrors of the mobile reflector walls, the sides of the towers remote from the sun within the cluster can be heated by reflected solar rays. In this manner the maximum utilization of the solar rays can be achieved within the cluster.

Although theoretically the cluster of towers could be located anywhere, some locations are much more favourable than others. The best location is a slightly hilly site, free from obstructions such as high trees and preferably away from normally very windy areas and locations which are affected by such things as flooding.

DESCRIPTION OF THE PREFERRED EMBODIMENTS

The impellers may be selected from a variety of different types presently available, it being appreciated that any arrangement of blades or vanes which will turn a shaft to which they are attached when exposed to wind may be called a wind-powered impeller. Among suitable impellers there can be mentioned the multi-blade turbine wheel (American type), propeller-type high speed wheels, etc. The impellers are preferably mounted on horizontal shafts with these horizontal shafts being directly connected to alternators for producing electrical energy. The impellers are preferably formed from a lightweight metal, e.g. aluminum alloy.

The reservoirs at the tops of the towers serve a dual purpose. They first serve as a reservoir for cooler water to be heated by way of the heating coils in the heating chambers. For this purpose, the water flows by gravity from the reservoirs at the tops of the towers down through the heating coils and into the reservoir at the bottom. These top reservoirs also serve a second important purpose in that the mass of the water in these reservoirs has an important stabilizing effect on the tall slender towers. Thus, when there is a large mass located at the top of each tower, they show greatly improved stability against winds. For this reason, they are preferably kept at least 40% full.

The reservoirs at the tops of the towers can conveniently be re-filled by pumping water to them when demand for electricity is low and therefore power is abundant, e.g. during the night or in the early morning.

The large surface areas being heated by solar energy may also further be utilized according to this invention as support for silicon strips for further direct electricity production.

The device is provided with automatic controls which regulate the airflow travelling up the tower. This can be done by measuring the impeller speeds within the tower and utilizing this to control dampers on inlet air at the base of the tower as well as from the solar heating chambers. For instance, during periods of peak solar radiation, only a minimum amount of solar energy may be required to provide convection airflow up the tower and the remainder of the solar energy can then be entirely concentrated in heating the water. On the other hand, during periods of minimum solar radiation, ambient air is directed through the heat exchange zones where this air picks up heat from the hot water of the reservoirs. In this way, a relatively constant upward airflow through the tower is maintained.

BRIEF DESCRIPTION OF THE DRAWINGS

The invention is further illustrated by the attached drawings in which:

FIG. 4 is an elevation view of a mobile reflector wall;

FIG. 5 is an end elevation view of a mobile reflector wall;

The power plant includes a series of towers 10 each mounted on a base portion 11 and including a bottom air inlet 12 and a top air outlet 13. Each tower tapers inwardly towards the top. Mounted on the peripheral wall 14 of each tower are a series of outwardly projecting and vertically spaced solar heating chambers 15. Each of these chambers 15 is composed of a series of segments as shown in FIG. 2 divided by radial divider walls 18 and terminating in outer end walls 19. Mounted on the outer end of each chamber segment are a pair of concave mirrors 17A and 17B which are independently tiltable. As shown in FIG. 3, the solar heating chambers 15 have a top face 20 and a bottom face 21. Directly beneath the top faces 21 are tubular copper heat exchange coils 22. These tubes carry water which is heated by the absorbtion of solar rays. Within each heating chamber compartment 15 is a airflow deflector defining an airflow path along the solar heating surfaces. An inlet is provided for introducing ambient air into the flow path and an outlet is provided in tower wall 14 for introducing heated air into the tower.

Figure 1:
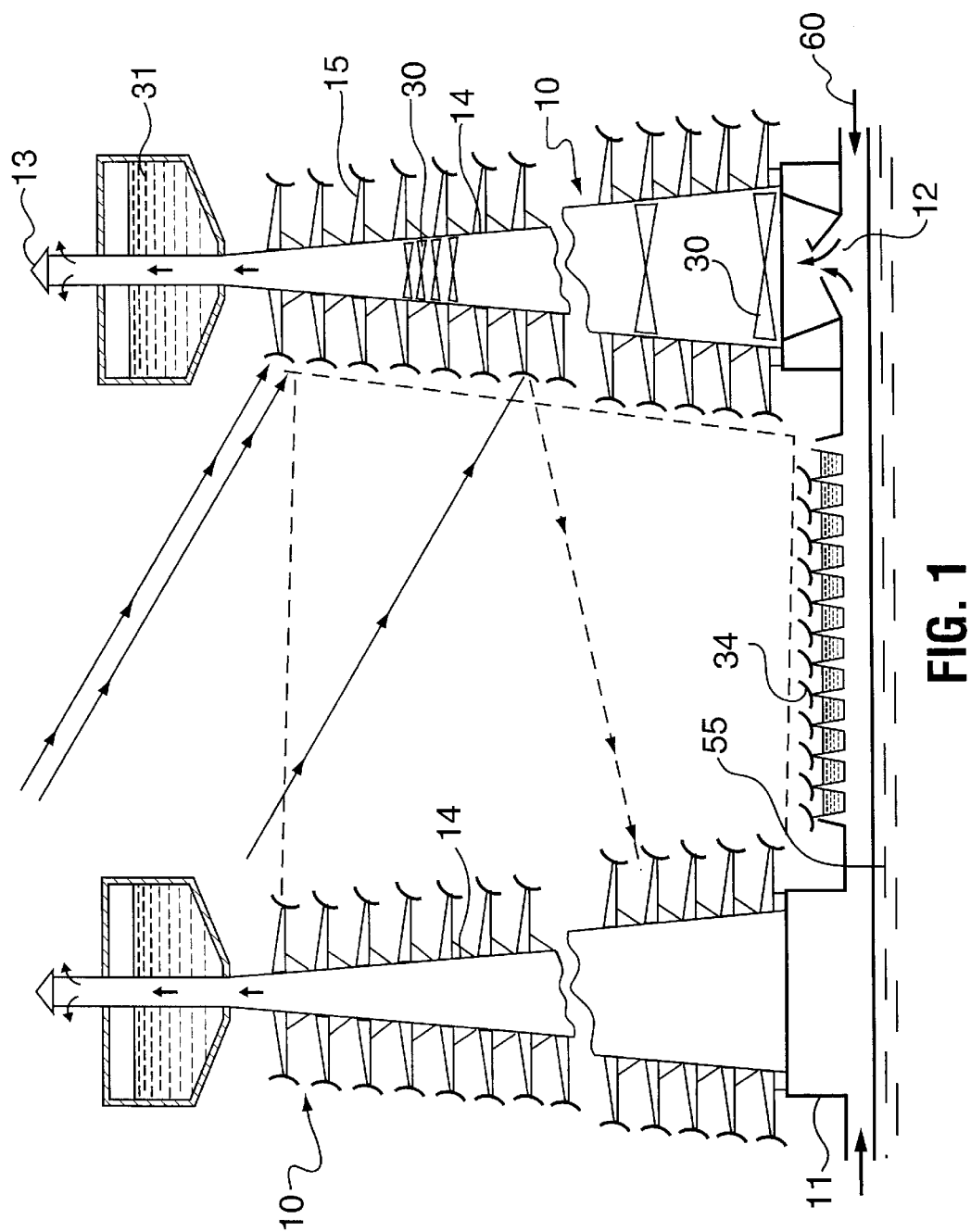
FIG. 1 is a schematic elevation view of one embodiment of the invention.
Figure 2:
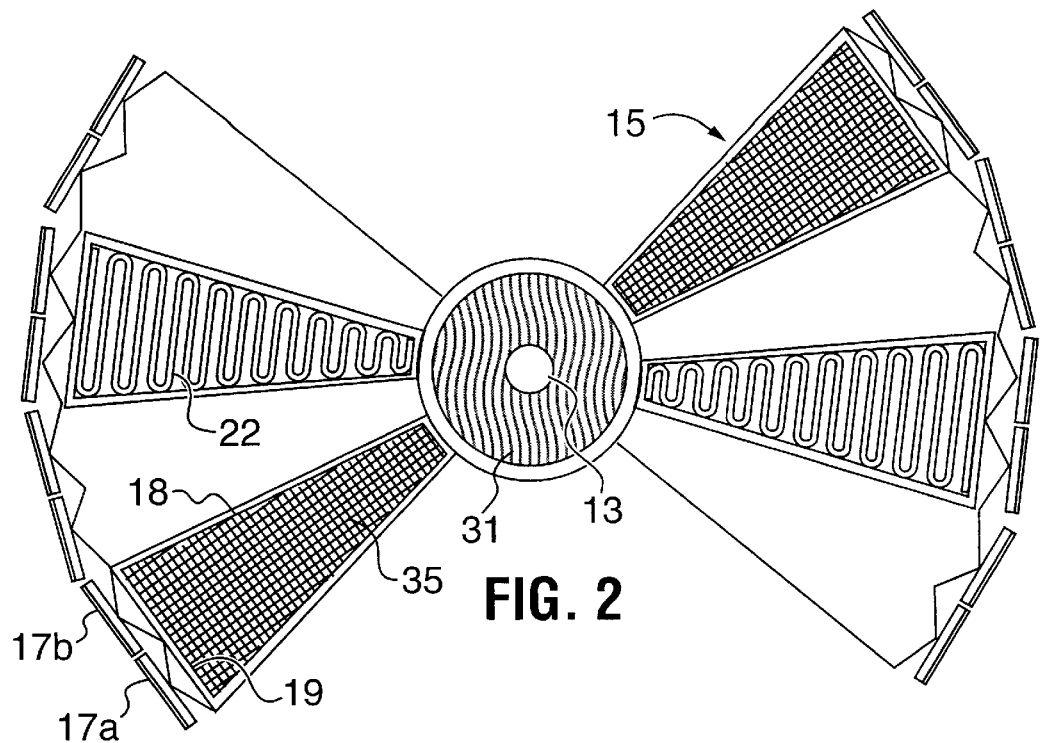
FIG. 2 is a top plane view of one tower in partial section.
Figure 3:
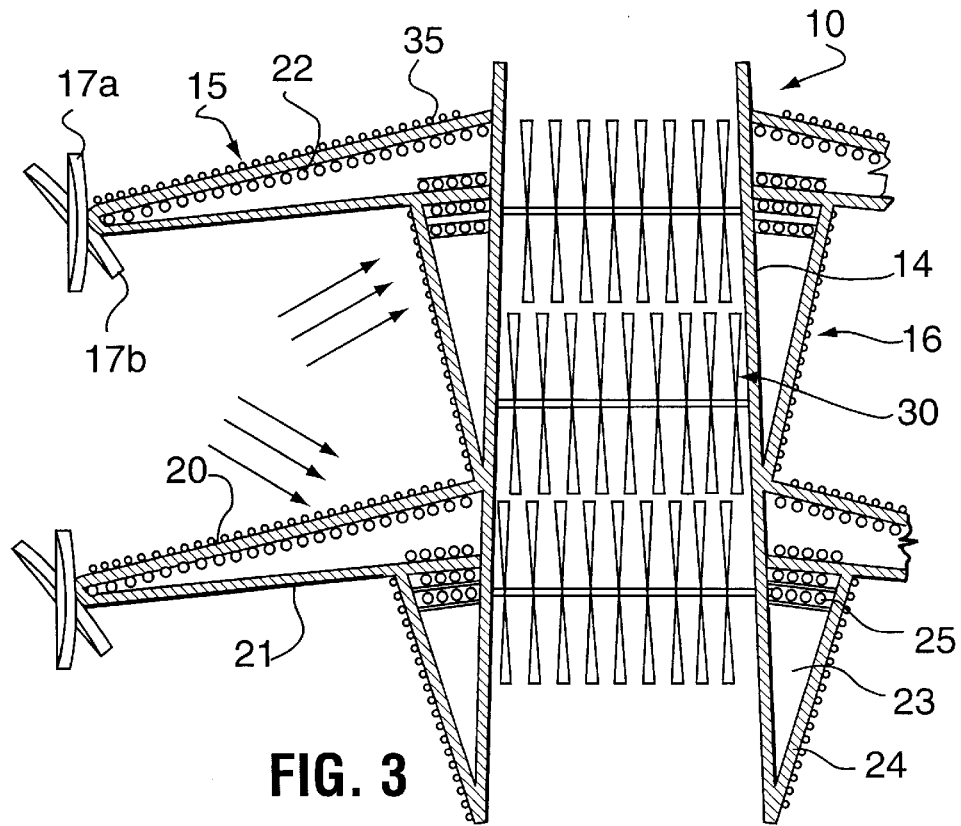
FIG. 3 is an elevation view in section showing a part of a tower.

Mounted beneath each segment of a heating chamber 15 is preferably mounted a secondary heating chamber 16 comprising a V-shaped chamber 23 having an outer wall 24 inclined upwardly and outwardly from the tower wall 14. Thus, the side walls of the V-shaped chamber 23 are formed by outer wall 24 and wall 14 of the tower 10. The outer wall 24 is connected at its upper end to the bottom face of chamber 15 thereby providing addition support for the chamber 15. Additional copper heating coils 25 are provided within the secondary heating chamber 23.

The heated air in the secondary chambers 16 may be controlled by computer responding thermocouples. When the temperature in any secondary chamber exceeds 10° C. over and above the outside air temperature, an inlet into the main tower body opens allowing the hotter air from the secondary chamber to flow into the tower and thus provide additional up-draft to power the impellers 30 within the tower. When the temperature in the secondary chamber again approaches ambient air temperature, the inlets close to allow the air within the secondary chamber to heat up.

The impellers 30 are in the form of light windmills. Each impeller is mounted on a horizontal axle and has a diameter of preferably about 1 meter. Two of these impellers 30 are typically mounted between adjacent pairs of radially projecting heating chambers 15.

Each heating chamber 15 adds further heat to the up-draft air in the tower 10. This means that the velocity of the up-draft air in the tower increases as it progresses up the tower. As seen in FIG. 1, outside air 60 flows across the surface of the water in the reservoir 55. This raises the temperature of the air by about 2–3° C. and provides a strong initial up-draft. With additional heating being added at each successive heating chamber 15, the velocity of the up-draft air increases by about 10% at each successive chamber 15. This means that the air velocity has increased by 200% when it reaches the twentieth chamber 15.

From FIG. 1 it can be seen that the direct solar rays in part strike the top faces of the heating chambers 15 and in part strike the concave mirrors 17A, 17B and 34. The reflected rays from the mirrors can be used to heat the sides of adjacent towers which are not directly in line with the rays from the sun. The mirrors can further be used to reflect rays from the sun onto the secondary heating chambers.

The fluid flow portion of the system includes a water reservoir 31 mounted at the top of each tower 10 and bottom reservoir 55 mounted within a support base. The top reservoir should always be kept at least 40% full. The reservoir 31 preferably has a sloped roof to allow for very heavy rain or heavy wet snow. The main support base may include an operational control centre and a plurality of upwardly reflecting mirrors 34 extending across the top of the support base between the towers 10.

An important feature of this invention is a mobile reflector wall system that moves on a track substantially surrounding the towers 10. As shown in FIGS. 4 and 5, each reflector wall 40 comprises a rigid frame structure 41 mounted on a heavy base 42. The structure is supported on wheels 43 which run on tracks 44. Heavy concrete block ballast 45 are provided at the top of the wall 40 and these are used to provide inertia against wind load. The combination of the heavy base 42 and the heavy ballast 40 at the top provide a high level of stability against wind load.

The side of each wall 40 facing the towers 10 comprises a series of horizontal and vertical frame members 46 forming a plurality of rectangular sections 47. Extending outwardly from frame 46 are a plurality of concave mirrors 50 mounted on pivotal mountings 51. Typically, there are mirrors 50 extending outwardly from alternate rectangular sections 47. The sections 47 that do not have a mirror 50 may comprise photovoltaic cells.

Figure 6:
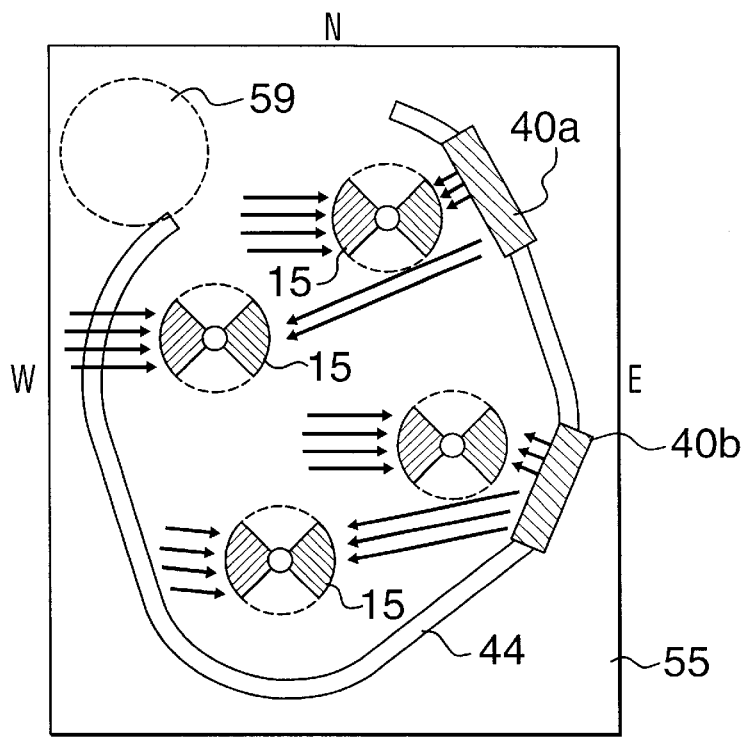
FIG. 6 is a plan view of a complete power plant with afternoon sun.
Figure 7:
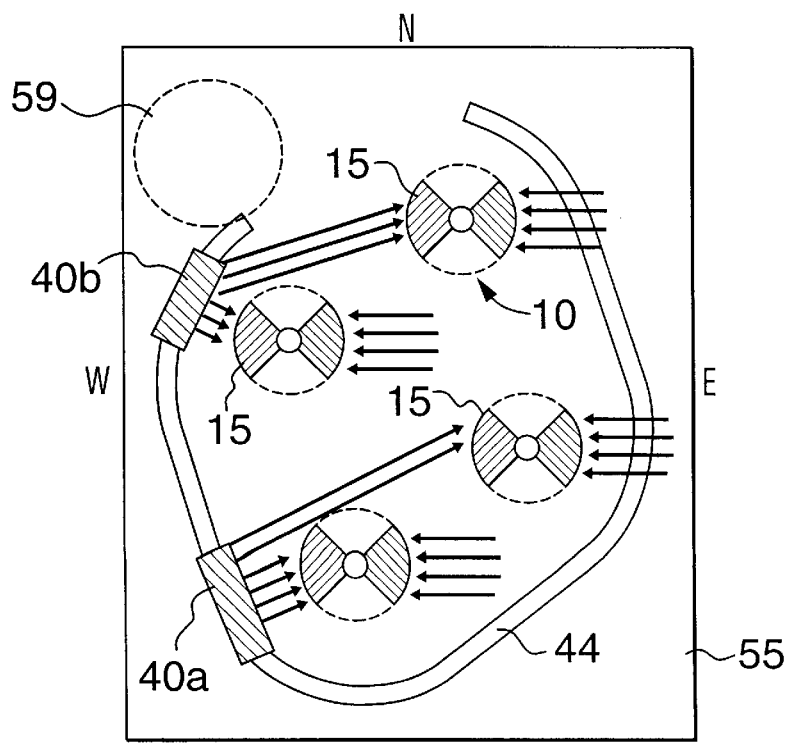
FIG. 7 is a further plan view of a complete power plant with morning sun.

The purpose of the mobile reflector walls can best be seen from FIGS. 6 and 7. In this arrangement, there are four equally spaced towers 10 with each tower having a pair of diametrically opposed approximately 90° C. segment-shaped chambers 15 facing in east and west directions. Two reflector walls 40a and 40b are provided to travel on track 44. FIG. 7 shows the position of the two reflector walls 40a and 40b in the morning. During the course of the day, the reflector walls 40a and 40b move with the sun until they reach the final afternoon position shown in FIG. 6. The locations of the walls 40a and 40b throughout the day combined with the angle of tilt of the concave mirrors 50 serve to concentrate sun rays on the chambers 15 of the towers 10, such that maximum exposure to solar radiation is maintained throughout each day. The travel of the reflector walls 40a and 40b and the tilt of the mirrors are controlled by a computer to follow the sun.

Figure 8:
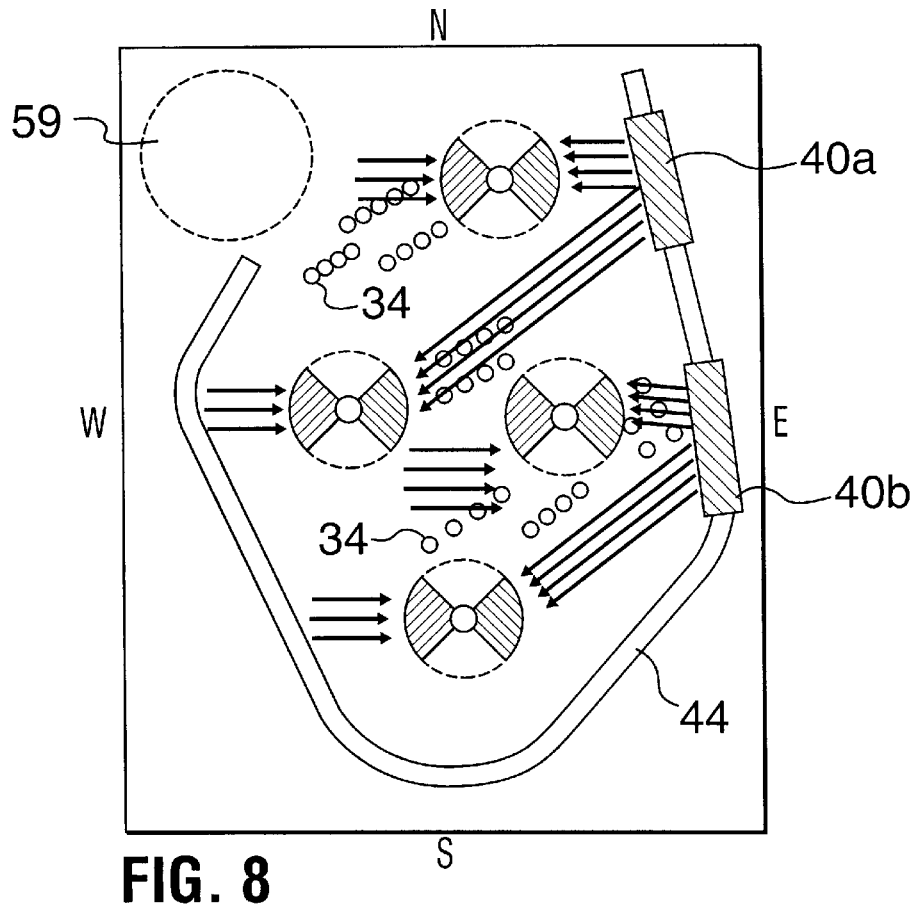
FIG. 8 is another plan view of a complete power plant with afternoon sun.
Figure 9:
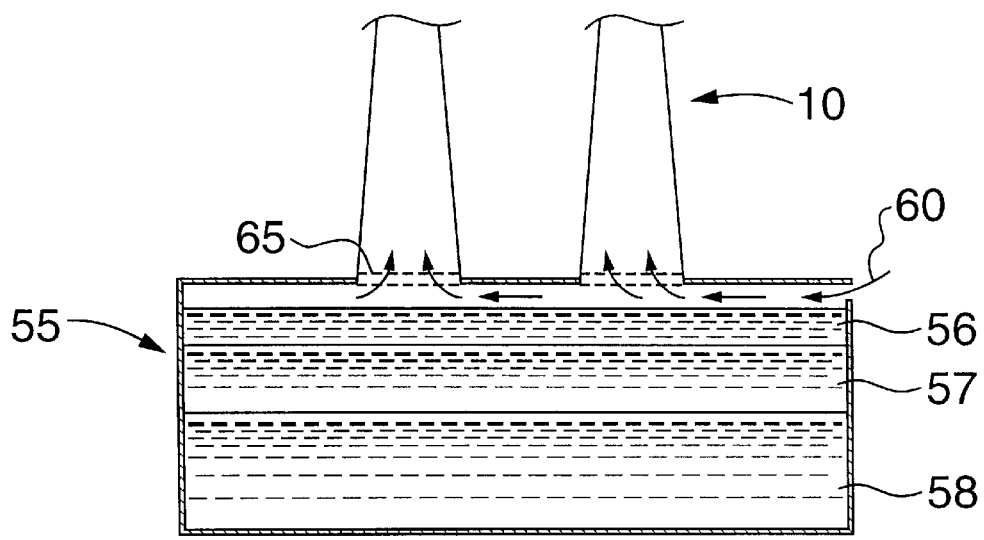
FIG. 9 is a sectional view of a water storage system.

As seen in FIGS. 6 and 7, the four towers 10 are arranged in a staggered or zigzag order on either side of the center of the group of towers. FIG. 8 shows a modification to the zigzag order. The track 44 for the reflector walls 40a and 40b travels around the group of towers 10 in an irregular path, this path being determined by the configuration of the positioning of the towers. The track 44 preferably comprises three straight sections and four curved sections with the four curved sections being adjacent each of the four towers. The straight sections are on the eastern, southern, and western sides of the group of towers and the four curved sections are all equally spaced from the adjacent towers.

The significance of this arrangement can be seen from FIGS. 6 to 8. Looking first at FIG. 7, it will be seen that the rays of morning sun from the east directly impact the westerly directed heating chambers 15. These rays also directly impact the mirrors of the reflector walls 40a and 40b which are aimed on the easterly directed heating chambers 15. In this way, both the easterly and westerly directed chambers 15 are simultaneously heated.

FIGS. 6 and 8 show how the situation has reversed when the sun is from the west. Now the westerly directed heating chambers 15 are directly heated and the easterly directed chambers 15 are heated by reflected rays from the reflector walls 40a and 40b that have moved to their afternoon positions.

When the sun is directly south, the reflector walls are not effective. However, because at this time the sun is at its highest point, the sun rays are able to contact both the easterly and westerly directed heating chambers 15 of each tower 10 without the aid of the reflector walls 40a and 40b. Thus, it will be seen that as the position of the sun lowers, the effectiveness of the reflector walls increases. As a result, they serve to maximize the effectiveness of the sun throughout the sunlight hours of each day.

In a typical installation, the reflector walls 40a and 40b have a height of about 24 meters and a length of about 20 meters. The rectangular sections 47 typically measure about 1×2 meters. Preferably, the reflector walls are spaced from the outer edges of the heating chambers 15 by a distance of about 15 to 18 meters.

While the arrangement of FIGS. 6 and 7 shows the combination of four towers 10 with two mobile reflector walls 40a and 40b, it is possible to use up to six towers in combination with two mobile reflector walls.

The tower system of the invention is also used to produce electricity directly by means of photovoltaic cells. These cells 35 are located on the top faces 20 of heating chambers 15 as well as on the outer walls 24 of secondary heating chambers 16. The cells 35 are capable of producing up to 10% of the total electricity produced by each tower.

The cluster of four towers is situated atop a partially underground water reservoir 55. Preferably, this bottom reservoir has a number of compartments. These include (a) an upper hot water compartment 56 where the water is kept at an average temperature of about 15 to 85° C., (b) a middle compartment 57 where the water is at a temperature of about 10 to 40° C. and (c) a lower compartment 58 where the water is typically at a temperature of about 5 to 20° C. Within this main water system, the water is recycled such as to minimize loss. Nevertheless, there is a certain amount of unavoidable evaporation loss and the system must include a reservoir 59 on the site for make-up water. This reservoir 59 holds substantially chemically pure water which is added to the system as needed.

The upper hot water compartment 56 is used for heating the inlet air 60 at the bottom of the towers. Thus, the air travels across the surface of the hot water picking up heat before travelling up through the towers 10. Of course, the air picks up not only heat but also large amounts of moisture from the water. A heavy moisture load in the rising air is very detrimental to the system and, therefore, it is necessary to decrease the moisture level of the air before it rises through the towers. Preferably, the moisture level is reduced to the order of about 1 to 1.5% This is accomplished by dehumidifier units 65 at the bottoms of the towers 10 through which the hot moist air passes.

The water in the middle compartment 57, particular when it is quite hot, may be used for additional purposes. For instance, it may be pressurized to create steam to power a steam turbine. The water in the lower compartment 58 is used to supply the reservoirs 31 at the top of towers 10.

Also for use in cold climates, the top reservoir may be constructed with multiple walls. These multiple walls may include a circulating air corridor. This air corridor prevents the water inside the reservoir from freezing and during day light hours the air within the outside and inside reservoir wall is heated by the lenses of the adjoining tower arms. This provides not only energy from sunlight, but also causes the air contained with the corridors to move by convection.

The water used in the reservoirs is preferably a soft water with most impurities removed, with chemically pure water being particularly preferred. For instance, water which is known to contain a large percentage of calcium may cause serious deposits within the flow conduits. Furthermore, in cold climates where the air temperature may go below the freezing point, it may be necessary to include a quantity of anti-freeze within the water. This water containing anti-freeze can, of course, be recirculated between the top and bottom reservoirs and is not, therefore, an environmental hazard.

These very large towers require maintenance and each tower is provided with an elevator which is used for both freight and personnel. The elevator is able to access the heating chambers at each level.

A revolving crane is also mounted on the top of each tower reservoir and is used for lifting heavy items such as replacement parts for the heating chambers.

Although the present invention has been described in conjunction with preferred embodiment, it is to be understood that modifications and variations may be resorted to without departing from the spirit and scope of the invention, as those skilled in the art will readily understand. Such modifications and variations are considered to be within the purview and scope of the invention and appended claims.

I claim:

1. A solar energy powerplant comprising:
    a group of four or more vertical towers open at both ends, said towers being mounted on a base structure in an equally spaced configuration;
    a plurality of vertically spaced, radially projecting heating chambers mounted externally on each tower, the chambers at each level being arranged as a pair of diametrically opposed segment-shaped chambers projecting from the tower a distance at least equal to the radius of the adjoining tower, with each chamber being divided into a series of smaller segment-shaped compartments separated by radial divider walls, each said segment-shaped compartment having an inlet for ambient air and an outlet into the tower for heated air;
    tiltable concave mirrors mounted on the outermost edges of the segment-shaped chambers for directing sun rays onto the heating chambers of adjacent towers;
    mobile reflector walls mounted for travel on tracks substantially surrounding said group of vertical towers, said mobile walls extending a height substantially equal that of the highest heating chambers and being spaced laterally from the towers, with the face of each mobile wall facing the towers having mounted thereon a plurality of tiltable concave mirrors for directing sun rays onto the towers;
    a water reservoir mount at the top of each tower and a water reservoir in the base structure of the powerplant, conduit means for flowing water by gravity from the top reservoir through heat exchange coils in said heating chambers and into the base structure reservoir and pump and conduit means for pumping water up to the top reservoir, such that hotter water is stored in the reservoir in the base structure and cooler water is stored in the reservoir at the top of each tower; and
    wind-powered impellers horizontally mounted in each tower in vertically spaced locations in association with said heating chambers, said impellers being adapted to drive electrical generating units.

2. A solar energy powerplant according to claim 1 wherein each segment-shaped chamber comprises up to a 90° segment.

3. A solar energy powerplant according to claim 2 wherein each segment-shaped chamber comprises a 60 to 90° segment.

4. A solar energy powerplant according to claim 1 wherein a pair of independently tiltable concave mirrors is mounted on the outermost edge of each radially projecting heating chamber.

5. A solar energy powerplant according to claim 4 wherein concave mirrors are mounted at the base in the regions between the group of towers.

6. A solar energy powerplant according to claim 1 wherein said group of towers are mounted on a single base portion, said base containing an insulated water reservoir.

7. A solar energy powerplant according to claim 1 which includes photovoltaic cells for direct electricity production located on the top faces of the radially projecting heating chambers.

8. A solar energy powerplant according to claim 1 wherein the pair of diametrically opposed segment-shaped heating chambers on each tower are located to face east and west and the at least four towers of the group are arranged in a zigzag order on either side of the center of the group of towers.

9. A solar energy powerplant according to claim 8 wherein the tracks for the reflector walls comprise three substantially straight sections joined by curved section, with the curved sections being adjacent towers.

10. A solar energy powerplant according to claim 9 wherein the track curved sections are equally spaced from adjacent towers.

11. A solar energy powerplant according to claim 10 wherein the face of each mobile reflector wall facing the towers comprises a plurality of rectangular or square sections with the tiltable concave mirrors being mounted in alternate sections.

12. A solar energy powerplant according to claim 11 wherein the rectangular or square sections not containing mirrors comprise photovoltaic cells for direct electricity production.

13. A solar energy powerplant according to claim 1 wherein the water reservoir in the base structure comprises three compartments including (a) an upper hot water compartment, (b) a middle warm water compartment and (c) a lower cool water compartment.

14. A solar energy powerplant according to claim 13 wherein the upper hot water compartment includes an air space above the water, an air inlet for outside air into said air space and outlets from said air space into the bottoms of the towers.

15. A solar energy powerplant according to claim 14 wherein the bottoms of the towers include dehumidifiers for removing moisture from the air entering the towers.

16. A solar energy powerplant according to claim 13 wherein the lower cool water compartment is connected to pump means for recycling water to the water reservoirs at the tops of the towers.

* * * * *